(12) United States Patent
Mori et al.

(10) Patent No.: US 8,105,566 B2
(45) Date of Patent: Jan. 31, 2012

(54) METHOD FOR PRODUCING OXYGEN-CONTAINING HALOGENATED FLUORIDE

(75) Inventors: Isamu Mori, Ube (JP); Akiou Kikuchi, Ube (JP)

(73) Assignee: Central Glass Company, Limited, Ube-shi (JP)

( * ) Notice: Subject to any disclaimer, the term of this patent is extended or adjusted under 35 U.S.C. 154(b) by 0 days.

(21) Appl. No.: 12/921,679

(22) PCT Filed: Feb. 16, 2009

(86) PCT No.: PCT/JP2009/052553
§ 371 (c)(1),
(2), (4) Date: Sep. 9, 2010

(87) PCT Pub. No.: WO2009/113362
PCT Pub. Date: Sep. 17, 2009

(65) Prior Publication Data
US 2011/0008242 A1  Jan. 13, 2011

(30) Foreign Application Priority Data
Mar. 10, 2008 (JP) .................................. 2008-059739

(51) Int. Cl.
*C01B 11/24* (2006.01)
(52) U.S. Cl. ...................................... 423/466; 423/472
(58) Field of Classification Search .................. 423/466, 423/472
See application file for complete search history.

(56) References Cited

U.S. PATENT DOCUMENTS

| | | | |
|---|---|---|---|
| 2,982,618 A | 5/1961 | Dess | |
| 3,375,072 A | 3/1968 | Yodis et al. | |
| 3,404,958 A * | 10/1968 | Beardell et al. | 423/466 |
| 3,532,474 A * | 10/1970 | Grakauskas | 423/386 |
| 3,556,726 A | 1/1971 | Grakauskas | |
| 3,697,394 A * | 10/1972 | Pillipovich et al. | 204/157.48 |
| 3,718,557 A * | 2/1973 | Rogers et al. | 204/157.48 |
| 7,638,654 B2 * | 12/2009 | Toru et al. | 568/28 |
| 2010/0196251 A1 * | 8/2010 | Shibayama et al. | 423/466 |

FOREIGN PATENT DOCUMENTS

| | | |
|---|---|---|
| JP | 2000-159505 A | 6/2000 |
| JP | 2007-230961 A | 9/2007 |
| WO | WO 2008/155965 A1 | 12/2008 |

OTHER PUBLICATIONS

Davila, W. "Estudio de la reaccion termica entre fluor y hexoxido de cloro", Rev. fac. cienc. quim. Univ. nacl. La Plata (1956), pp. 27-32.*
Alfred Engelbrecht, et al., "Perchloryl Fluoride, $ClO_3F$ Preparation and Some Physical and Chemical Properties", Journal of Inorganic and Nuclear Chemistry, vol. 2, Issue 5-6, Jul. 1956, pp. 348-357.
George H. Cady, "Solubility and Reactions of Perchloryl Fluoride in Water", Journal of Fluorine Chemistry, vol. 11, Issues 3-4, Mar.-Apr. 1978, pp. 225-241.
International Search Report dated May 19, 2009 with English translation (Nine (9) pages).
PCT/ISA/237 (Three (3) pages).

* cited by examiner

*Primary Examiner* — Ngoc-Yen Nguyen
(74) *Attorney, Agent, or Firm* — Crowell & Moring LLP

(57) ABSTRACT

Disclosed is a method for producing an oxygen-containing halogenated fluoride, wherein a gas-liquid reaction is used. This method is a method for producing an oxygen-containing halogenated fluoride represented by the general formula: $XO_mF$ (where X represents a halogen atom (Cl, Br or I) constituting a halogen fluoride and m represents 3 or 4), wherein a mixed gas containing the halogen fluoride and fluorine is reacted with an $H_2O$ source.

1 Claim, 1 Drawing Sheet

METHOD FOR PRODUCING OXYGEN-CONTAINING HALOGENATED FLUORIDE

TECHNICAL FIELD

Figure 1:
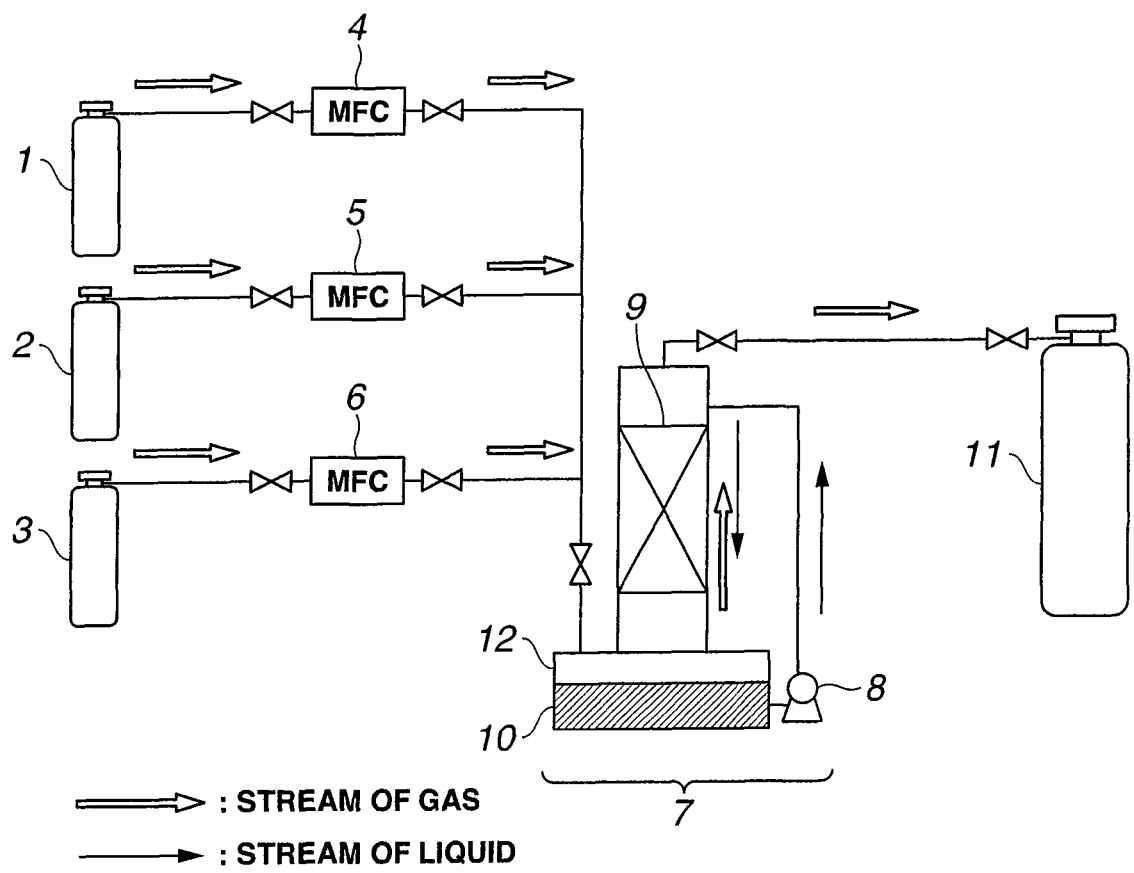

The present invention relates to a method for producing an oxygen-containing halogenated fluoride.

BACKGROUND OF THE INVENTION

An oxygen-containing halogenated fluoride is used for, for example, 1-fluoro-1,1-bis(arylsulfonyl)methane which is a physiologically active substance useful as a pharmaceutical drug and as a monofluoromethylation agent (Patent Document 1).

As examples of a method for producing an oxygen-containing halogenated fluoride, there have hitherto been known methods for producing $ClO_3F$ through a reaction between $KClO_3$ and $F_2$ (e.g. Non-Patent Document 1), a reaction between $KClO_3$ and $HSO_3F$ (e.g. Non-Patent Document 2) or the like.

These methods are mainly constructed of a solid-gas reaction. $F_2$ gas and a fluoride gas used in the solid-gas reaction are extremely active substances, so as to be increased in temperature as the reaction advances. Sometimes, the temperature increase finally causes an occurrence of an explosive reaction, decomposition of a solid material or the like. The similar temperature increase is brought about also in the case of fluorinating carbon monoxide or an organic compound by using a solid fluorination agent such as $CoF_3$ and $K_3NiF_7$. In the conventional production methods using the solid-gas reaction, therefore, it is required to prevent the temperature increase. This makes it difficult to efficiently and continuously product the target oxygen-containing halogenated fluoride.

On the other hand, an example of using a gas-liquid reaction in the method for producing an oxygen-containing halogenated fluoride has never been reported.

Patent Document 1: Japanese Patent Application Publication No. 2007-230961

Non-Patent Document 1: Journal of Inorganic and Nuclear Chemistry, Volume 2, Issues 5-6, July 1956, Pages 348-357

Non-Patent Document 2: Journal of Fluorine Chemistry, Volume 11, Issues 3-4, March-April 1978, Pages 225-241

SUMMARY OF THE INVENTION

An object of the present invention is to provide production of an oxygen-containing halogenated fluoride with a method for efficiently and continuously producing the oxygen-containing halogenated fluoride.

The present inventors had eagerly made studies in order to achieve the above object. As a result, it was found that the gas-liquid reaction can be used in production of oxygen-containing halogenated fluoride, thereby reaching the present invention.

More specifically, the present invention provides a method for producing an oxygen-containing halogenated fluoride represented by the general formula: $XO_mF$ where X represents a halogen atom (Cl, Br or I) constituting a halogen fluoride and m represents 3 or 4, wherein a mixed gas containing the halogen fluoride and fluorine is reacted with an $H_2O$ source.

BRIEF DESCRIPTION OF THE INVENTION

FIG. 1 A rough view of an embodiment of a system according to the present invention.

DETAILED DESCRIPTION

According to the present invention, production of an oxygen-containing halogenated fluoride represented by the general formula $XO_mF$ (wherein X and m represent Cl, Br or I and 3 or 4, respectively) can be efficiently and continuously achieved.

Hereinafter, the contents of the present invention will be discussed in detail.

In the present invention, concrete examples of halogen fluoride used as a gas material are $ClF_3$, $IF_3$, $IF_7$, $IF_5$, $ClF$, $BrF$, $BrF_3$ and $BrF_5$.

As an $H_2O$ source, water or an aqueous solution having pH=1-13 can be used in the present invention, the aqueous solution including a HF aqueous solution, a KF aqueous solution, a KOH aqueous solution, a NaOH aqueous solution, a $K_2CO_3$ aqueous solution, a NaF aqueous solution, a $Al(OH)_3$ aqueous suspension and the like.

Halogen fluoride and fluorine in a mixed gas are not particularly limited in amount; however, it is preferable in terms of yield to have an equal amount on a volume basis or to have an excessive amount of fluorine relative to an amount of halogen fluoride.

Additionally, a temperature at which a liquid material is used is not particularly limited.

The gas material containing halogen fluoride and fluorine, and the liquid material containing the $H_2O$ source, are introduced to the gas-liquid reaction, thereby obtaining an oxygen-containing halogenated fluoride represented by the general formula $XO_mF$ (wherein X and m represent a halogen atom constituting the above-mentioned halogen fluoride (Cl, Br or I) and 3 or 4, respectively) can be efficiently and continuously achieved. Concrete examples of the oxygen-containing halogenated fluoride obtained by the present invention and represented by the general formula $XO_mF$ are $ClO_4F$, $ClO_3F$, $BrO_3F$ and $IO_3F$. As a method for bringing the gas material and the liquid material into contact for the gas-liquid reaction, a counter flow contact or a parallel flow contact can be adapted. Of these, the counter flow contact is more preferable if taking account of efficiency of contact between the gas and liquid. Furthermore, a reaction temperature at which the gas material and the liquid material are introduced to the gas-liquid reaction is required only to be a temperature at which the liquid material can be brought into contact with the gas material while keeping the form of liquid.

Moreover, an apparatus used in the present invention is required only to have a structure capable of: supplying the gas material and the liquid material to a reactor for the gas-liquid reaction of the present invention; bringing the gas material and the liquid material into contact with each other in the reactor; and taking gas out of the reactor. A usable reactor includes those having a mechanism which can circulate the liquid material. The preferable material for the reactor is a stainless steel, a Ni steel, an iron and steel, Monel, Inconel, aluminum or the like.

Hereinafter, the present invention will be discussed in detail with reference to Examples.

EXAMPLES

In FIG. 1, a rough view of an embodiment of a system according to the present invention is shown. A reactor 7 is provided to have a packed column 9 filled with a packing material, a raw material liquid 10 to be reacted with the introduced gas material, a liquid tank 12 having a capacity enough to store the raw material liquid 10 and having an inner surface on which lining was conducted with polytetrafluoroethylene, and a liquid feed pump 8 for liquid-feeding the raw material liquid 10 within the liquid tank 12 into a position above the packing material, in which a gas material introduced from the bottom section of the packed column 9 is brought into a counter flow contact with the raw material liquid 10 and is released from the upper section of the reactor 7.

Dilution gas ($N_2$) from a gas cylinder 1, $F_2$ from a gas cylinder 2 and $ClF_3$ from a gas cylinder 3 are controlled in flow amount by using massflow controllers (MFC) 4, 5 and 6, respectively, to have a certain flow amount, and additionally introduced into the reactor 7 to be brought into a counter flow contact with the raw material liquid 10. Thereafter, a gas released from the reactor 7 is trapped by an empty container 11. The gas trapped in the empty container 11 was analyzed by a Fourier transform infrared spectrophotometer (FT-IR (IG-1000 produced by Otsuka Electronics Co., Ltd.)) thereby measuring the concentration of $ClO_3F$.

Example 1

A packed column 9 formed by conducting lining of 0.1 mm thickness polytetrafluoroethylene on an inner wall of a cylinder formed of SUS 316 and having a length of 650 mm and an inner diameter of 25 mm was filled with Raschig rings having a diameter of 4 mm and formed of PTFE (polytetrafluoroethylene), as a packing material. A mixed gas so prepared by using MFC as to have a gas composition of $ClF_3:F_2:N_2=2$ vol %:2 vol %:96 vol % was introduced into a reactor 7 using 4 mass %-hydrogen fluoride aqueous solution (pH=1) as a raw material liquid 10, at 0.274 l/min (superficial linear velocity: $9.31\times10^{-3}$ m/sec) and at a reaction temperature of 24° C. Thereafter, a gas released from the reactor 7 was trapped by an empty container 11.

The $ClO_3F$ concentration in the gas trapped in the empty container 11 was analyzed by the FT-IR (IG-1000 produced by Otsuka Electronics Co., Ltd.). As a result, the $ClO_3F$ concentration was 2753 ppm, so that it was confirmed that $ClO_3F$ was generated. Additionally, the yield based on Cl was 13.8%.

Example 2

It was performed on conditions similar to those of Example 1 with the exception that a mixed gas so prepared by using MFC as to have a gas composition of $ClF_3:F_2:N_2=4.4$ vol %:5.5 vol %:90.1 vol % was used as the mixed gas. The $ClO_3F$ concentration in the gas trapped after passing through the reactor 7 was analyzed by the FT-IR (IG-1000 produced by Otsuka Electronics Co., Ltd.), as well as Example 1.

As a result, the $ClO_3F$ concentration was 3380 ppm, so that it was confirmed that $ClO_3F$ was generated. Additionally, the yield based on Cl was 7.68%.

Example 3

It was performed on conditions similar to those of Example 1 with the exception that a mixed gas so prepared by using MFC as to have a gas composition of $ClF_3:F_2:N_2=4.4$ vol %:7.8 vol %:87.8 vol % was used as the mixed gas. The $ClO_3F$ concentration in the gas trapped after passing through the reactor 7 was analyzed by the FT-IR (IG-1000 produced by Otsuka Electronics Co., Ltd.), as well as Example 1.

As a result, the $ClO_3F$ concentration was 3496 ppm, so that it was confirmed that $ClO_3F$ was generated. Additionally, the yield based on Cl was 7.95%.

Example 4

It was performed on conditions similar to those of Example 1 with the exception that a mixed gas so prepared by using MFC as to have a gas composition of $ClF_3:F_2:N_2=24.8$ vol %:11.2 vol %:64 vol % was used as the mixed gas. The $ClO_3F$ concentration in the gas trapped after passing through the reactor 7 was analyzed by the FT-IR (IG-1000 produced by Otsuka Electronics Co., Ltd.), as well as Example 1.

As a result, the $ClO_3F$ concentration was 8186 ppm, so that it was confirmed that $ClO_3F$ was generated. Additionally, the yield based on Cl was 3.3%.

Example 5

It was performed on conditions similar to those of Example 1 with the exception that a mixed gas so prepared by using MFC as to have a gas composition of $ClF_3:F_2:N_2=2$ vol %:3 vol %:95 vol % was used as the mixed gas. The $ClO_3F$ concentration in the gas trapped after passing through the reactor 7 was analyzed by the FT-IR (IG-1000 produced by Otsuka Electronics Co., Ltd.), as well as Example 1.

As a result, the $ClO_3F$ concentration was 3065 ppm, so that it was confirmed that $ClO_3F$ was generated. Additionally, the yield based on Cl was 15.3%.

Example 6

It was performed on conditions similar to those of Example 1 with the exception that a mixed gas so prepared by using MFC as to have a gas composition of $ClF_3:F_2:N_2=2$ vol %:2 vol %:96 vol % was used as the mixed gas and that the mixed gas is introduced at 1.096 l/min (superficial linear velocity: $3.72\times10^{-2}$ m/sec). The $ClO_3F$ concentration in the gas trapped after passing through the reactor 7 was analyzed by the FT-IR (IG-1000 produced by Otsuka Electronics Co., Ltd.), as well as Example 1.

As a result, the $ClO_3F$ concentration was 2350 ppm, so that it was confirmed that $ClO_3F$ was generated. Additionally, the yield based on Cl was 11.8%.

Example 7

It was performed on conditions similar to those of Example 1 with the exception that a mixed gas so prepared by using MFC as to have a gas composition of $ClF_3:F_2:N_2=10$ vol %:10 vol %:80 vol % was used as the mixed gas and that the mixed gas is introduced at 1.096 l/min (superficial linear velocity: $3.72\times10^{-2}$ m/sec). The $ClO_3F$ concentration in the gas trapped after passing through the reactor 7 was analyzed by the FT-IR (IG-1000 produced by Otsuka Electronics Co., Ltd.), as well as Example 1.

As a result, the $ClO_3F$ concentration was 7962 ppm, so that it was confirmed that $ClO_3F$ was generated. Additionally, the yield based on Cl was 7.96%.

Example 8

It was performed on conditions similar to those of Example 1 with the exception that a mixed gas so prepared by using MFC as to have a gas composition of $ClF_3:F_2:N_2=6.9$ vol %:6.9 vol %:86.2 vol % was used as the mixed gas and that the mixed gas is introduced at 1.096 l/min (superficial linear velocity: $3.72\times10^{-2}$ m/sec). The $ClO_3F$ concentration in the gas trapped after passing through the reactor 7 was analyzed by the FT-IR (IG-1000 produced by Otsuka Electronics Co., Ltd.), as well as Example 1.

As a result, the $ClO_3F$ concentration was 7051 ppm, so that it was confirmed that $ClO_3F$ was generated. Additionally, the yield based on Cl was 10.2%.

Example 9

It was performed on conditions similar to those of Example 1 with the exception that: 5 mass %-aluminium hydroxide aqueous suspension (pH=7) was used as the raw material liquid 10; a mixed gas so prepared with MFC as to have a gas composition of $ClF_3:F_2:N_2$=4.3 vol %:2.0 vol %:93.7 vol % was used as the mixed gas; and the reaction temperature was 40° C. The $ClO_3F$ concentration in the gas trapped after passing through the reactor 7 was analyzed by the FT-IR (IG-1000 produced by Otsuka Electronics Co., Ltd.), as well as Example 1.

As a result, the $ClO_3F$ concentration was 2626 ppm, so that it was confirmed that $ClO_3F$ was generated. Additionally, the yield based on Cl was 6.1%.

Example 10

It was performed on conditions similar to those of Example 1 with the exception that water (pH=7) was used as the raw material liquid 10 and that a mixed gas so prepared with MFC as to have a gas composition of $ClF_3:F_2:N_2$=2.7 vol %:12.9 vol %:84.4 vol % was used as the mixed gas. The $ClO_3F$ concentration in the gas trapped after passing through the reactor 7 was analyzed by the FT-IR (IG-1000 produced by Otsuka Electronics Co., Ltd.), as well as Example 1.

As a result, the $ClO_3F$ concentration was 13709 ppm, so that it was confirmed that $ClO_3F$ was generated. Additionally, the yield based on Cl was 50.8%.

Example 11

It was performed on conditions similar to those of Example 10 with the exception that a mixed gas so prepared with MFC as to have a gas composition of $ClF_3:F_2:N_2$=5.6 vol %:12.9 vol %:81.5 vol % was used as the mixed gas. The $ClO_3F$ concentration in the gas trapped after passing through the reactor 7 was analyzed by the FT-IR (IG-1000 produced by Otsuka Electronics Co., Ltd.), as well as Example 10.

As a result, the $ClO_3F$ concentration was 21508 ppm, so that it was confirmed that $ClO_3F$ was generated. Additionally, the yield based on Cl was 30.4%.

Example 12

It was performed on conditions similar to those of Example 1 with the exception that 40 mass %-potassium hydroxide aqueous solution (pH=13) was used as the raw material liquid 10 and that a mixed gas so prepared by using MFC as to have a gas composition of $ClF_3:F_2:N_2$=2.7 vol %:12.9 vol %:84.4 vol %. The $ClO_3F$ concentration in the gas trapped after passing through the reactor 7 was analyzed by the FT-IR (IG-1000 produced by Otsuka Electronics Co., Ltd.), as well as Example 1.

As a result, the $ClO_3F$ concentration was 8514 ppm, so that it was confirmed that $ClO_3F$ was generated. Additionally, the yield based on Cl was 31.5%.

Example 13

It was performed on conditions similar to those of Example 1 with the exception that 10 mass %-potassium carbonate aqueous solution (pH=10) was used as the raw material liquid 10 and that a mixed gas so prepared by using MFC as to have a gas composition of $ClF_3:F_2:N_2$=2.7 vol %:12.9 vol %:84.4 vol %. The $ClO_3F$ concentration in the gas trapped after passing through the reactor 7 was analyzed by the FT-IR (IG-1000 produced by Otsuka Electronics Co., Ltd.), as well as Example 1.

As a result, the $ClO_3F$ concentration was 9624 ppm, so that it was confirmed that $ClO_3F$ was generated. Additionally, the yield based on Cl was 35.6%.

Example 14

It was performed on conditions similar to those of Example 1 with the exception that a mixed gas so prepared by using MFC as to have a gas composition of $ClF_3:F_2:N_2$=4.4 vol %:7.8 vol %:87.8 vol % and that the reaction temperature was 40° C. The $ClO_3F$ concentration in the gas trapped after passing through the reactor 7 was analyzed by the FT-IR (IG-1000 produced by Otsuka Electronics Co., Ltd.), as well as Example 1.

As a result, the $ClO_3F$ concentration was 3536 ppm, so that it was confirmed that $ClO_3F$ was generated. Additionally, the yield based on Cl was 8.03%.

Comparative Example 1

It was performed on conditions similar to those of Example 10 with the exception that a mixed gas so prepared by using MFC as to have a gas composition of $ClF_3:F_2:N_2$=0 vol %:12.9 vol %:87.1 vol % and that the reaction temperature was 40° C. The $ClO_3F$ concentration in the gas trapped after passing through the reactor 7 was analyzed by the FT-IR (IG-1000 produced by Otsuka Electronics Co., Ltd.), as well as Example 10.

As a result, $ClO_3F$ was not confirmed.

Comparative Example 2

It was performed on conditions similar to those of Comparative Example 1 with the exception that 4 mass %-hydrogen fluoride aqueous solution was used as the raw material liquid 10. The $ClO_3F$ concentration in the gas trapped after passing through the reactor 7 was analyzed by the FT-IR (IG-1000 produced by Otsuka Electronics Co., Ltd.), as well as Comparative Example 1.

As a result, $ClO_3F$ was not confirmed.

Comparative Example 3

It was performed on conditions similar to those of Comparative Example 2 with the exception that a mixed gas so prepared with MFC as to have a gas composition of $ClF_3:F_2:N_2$=12.9 vol %:0 vol %:87.1 vol % was used as the mixed gas. The $ClO_3F$ concentration in the gas trapped after passing through the reactor 7 was analyzed by the FT-IR (IG-1000 produced by Otsuka Electronics Co., Ltd.), as well as Comparative Example 2.

As a result, $ClO_3F$ was not confirmed.

Comparative Example 4

It was performed on conditions similar to those of Comparative Example 1 with the exception that a mixed gas so prepared with MFC as to have a gas composition of $ClF_3:F_2:N_2$=12.9 vol %:0 vol %:87.1 vol % was used as the mixed gas. The $ClO_3F$ concentration in the gas trapped after passing through the reactor 7 was analyzed by the FT-IR (IG-1000 produced by Otsuka Electronics Co., Ltd.), as well as Comparative Example 1.

As a result, $ClO_3F$ was not confirmed.

The above-mentioned measurement results are shown in Table 1.

TABLE 1

| Example | Gas flow amount (l/min) | Raw material gas composition (vol %) ClF$_3$ | F$_2$ | N$_2$ | Raw material liquid | Raw material liquid pH | ClO$_3$F concentration in gas released from reactor (ppm) | Yield based on Cl |
|---|---|---|---|---|---|---|---|---|
| Example 1 | 0.274 | 2 | 2 | 96 | HF aqueous solution | 1 | 2753 | 13.8 |
| Example 2 | 0.274 | 4.4 | 5.5 | 90.1 | HF aqueous solution | 1 | 3380 | 7.68 |
| Example 3 | 0.274 | 4.4 | 7.8 | 87.8 | HF aqueous solution | 1 | 3496 | 7.95 |
| Example 4 | 0.274 | 24.8 | 11.2 | 64 | HF aqueous solution | 1 | 8186 | 3.3 |
| Example 5 | 0.274 | 2 | 3 | 95 | HF aqueous solution | 1 | 3065 | 15.3 |
| Example 6 | 1.096 | 2 | 2 | 96 | HF aqueous solution | 1 | 2350 | 11.8 |
| Example 7 | 1.096 | 10 | 10 | 80 | HF aqueous solution | 1 | 7962 | 7.96 |
| Example 8 | 1.096 | 6.9 | 6.9 | 86.2 | HF aqueous solution | 1 | 7051 | 10.2 |
| Example 9 | 0.274 | 4.3 | 2 | 93.7 | Al(OH)$_3$ aqueous suspension | 7 | 2626 | 6.1 |
| Example 10 | 0.274 | 2.7 | 12.9 | 84.4 | Water | 7 | 13709 | 50.8 |
| Example 11 | 0.274 | 5.6 | 12.9 | 81.5 | Water | 7 | 21508 | 30.4 |
| Example 12 | 0.274 | 2.7 | 12.9 | 84.4 | KOH aqueous solution | 13 | 8514 | 31.5 |
| Example 13 | 0.274 | 2.7 | 12.9 | 84.4 | K$_2$CO$_3$ aqueous solution | 10 | 9624 | 35.6 |
| Example 14 | 0.274 | 4.4 | 7.8 | 87.8 | HF aqueous solution | 1 | 3536 | 8.03 |
| Comparative Example 1 | 0.274 | 0 | 12.9 | 87.1 | Water | 7 | 0 | 0 |
| Comparative Example 2 | 0.274 | 0 | 12.9 | 87.1 | HF aqueous solution | 1 | 0 | 0 |
| Comparative Example 3 | 0.274 | 12.9 | 0 | 87.1 | HF aqueous solution | 1 | 0 | 0 |
| Comparative Example 4 | 0.274 | 12.9 | 0 | 87.1 | Water | 7 | 0 | 0 |

The oxygen-containing halogenated fluoride obtained by the present invention can be used as a selective fluorination agent, for: monomethyl fluorination; selective fluorination of ester; and fluorination of ketone.

EXPLANATION OF REFERENCE NUMERALS

1: Dilution gas (N$_2$) cylinder
2: F$_2$ gas cylinder
3: ClF$_3$ gas cylinder
4: Massflow controller for dilution gas
5: Massflow controller for F$_2$
6: Massflow controller for ClF$_3$
7: Reactor
8: Liquid feed pump 8
9: Packed column
10: Raw material liquid
11: Empty container
12: Liquid tank

The invention claimed is:

1. A method for producing an oxygen-containing halogenated fluoride represented by general formula XO$_m$F where X represents a halogen atom Cl, Br or I and m represents 3 or 4, wherein a mixed gas containing a halogen fluoride and fluorine is reacted with an H$_2$O source.

* * * * *